(12) United States Patent
Skurdal (10) Patent No.: US 9,798,358 B1
(45) Date of Patent: Oct. 24, 2017

(54) BEDSIDE CLOCK WITH DEVICE RECEIVING WELL

(71) Applicant: SDI Technologies, Inc., Rahway, NJ (US)

(72) Inventor: Andrew Skurdal, Cranford, NJ (US)

(73) Assignee: SDI Technologies, Inc., Rahway, NJ (US)

( * ) Notice: Subject to any disclaimer, the term of this patent is extended or adjusted under 35 U.S.C. 154(b) by 0 days.

(21) Appl. No.: 15/415,364

(22) Filed: Jan. 25, 2017

(51) Int. Cl.
*G06F 1/16* (2006.01)
*H04R 1/02* (2006.01)

(52) U.S. Cl.
CPC ........... *G06F 1/1632* (2013.01); *H04R 1/028* (2013.01); *H04R 2499/15* (2013.01)

(58) Field of Classification Search
CPC .... G06F 1/1637; G06F 1/1601; G06F 1/1633; G06F 21/86
See application file for complete search history.

(56) References Cited

U.S. PATENT DOCUMENTS

| | | | |
|---|---|---|---|
| D585,898 S * | 2/2009 | Skurdal | D14/434 |
| D586,780 S * | 2/2009 | Skurdal | D14/211 |
| D610,572 S * | 2/2010 | Skurdal | D14/216 |
| D645,839 S * | 9/2011 | Skurdal | D14/171 |
| 2010/0308037 A1* | 12/2010 | Mangiardi | H02G 3/185 220/3.5 |
| 2015/0122575 A1* | 5/2015 | Park | H04R 1/2811 181/182 |

* cited by examiner

Primary Examiner — Mohammad Islam
(74) Attorney, Agent, or Firm — Leason Ellis LLP (57) ABSTRACT

A base unit is adapted to physically and electronically engage with an electronic device. The base unit includes a well within a top surface the base unit, which is sized and shaped to receive the electronic device in a close fitting relation. The base unit includes an internal chamber and access window that permits the electrical connection between the electronic device and the base unit while the electronic device is seated in the well using a connector wire. The internal chamber obscures the connector wire so that it cannot be readily, visibly seen from a top surface of the base unit. Connections established using insulated conductive wires enable power, data, and commands to be exchanged between the electronic unit and the base unit while concurrently preventing or impeding removal of the electronic device from the base unit. Alternative arrangements seat the electronic device within base unit and employ wireless connections therebetween.

14 Claims, 9 Drawing Sheets

BEDSIDE CLOCK WITH DEVICE RECEIVING WELL

TECHNICAL FIELD

A system, method, and device for providing an electronic base unit that provides concealed electrical connection to an electrical accessory device are provided.

BACKGROUND OF THE INVENTION

It has been realized that providing a base unit electronic device for connection to an electronic accessory device can greatly improve the functionality of the two devices when they are connected and operating together. For example, certain devices permit a smart phone to be connected an alarm clock base unit. Electrically connecting the smart phone to the base unit can offer several advantages, such as, the base unit can then provide electrical power to the smart phone that can power and/or charge the smart phone during operation. The base unit can also include functional hardware, such as speakers, that can function in combination with the smart phone in which the smart phone can provide audio data through the electrical connection and enhanced sound can be reproduced via the speakers of the base unit.

While the connection between the smart phone and the base unit provides many advantages, there are several disadvantages associated with typical units. If the smart phone is connected to the base unit via wires, the wires are typically visible to the user and at least partially external to the device, which creates issues such as the need to position the wire so as to have slack for connection to the phone. Meanwhile, the wire can interfere with enjoyment of the base unit, such as when the wire extends over or around the base unit, possibly interfering with controls on the base unit, obscuring display screens or the speakers and most typically consuming a portion of a surface, such as a night stand. In addition, the visible location of the wire detracts from the overall aesthetic appearance of the base unit. These same issues are not limited to smart phones and can arise when other electronic accessory devices, such home personal assistant devices (e.g., Amazon Dot, Google Home, etc.).

Accordingly, there is a need to provide an electronic base unit that receives accessory devices and provides for concealed and aesthetically pleasing electrical connection between the base unit and an accessory device. The present invention as described herein provides a solution to this and other problems.

SUMMARY

According to one aspect of the invention, an electronic base unit that is adapted to physically and electronically engage with an electronic device is provided. The electronic device includes a housing with a top wall, a bottom wall, and a side wall extending therebetween. The electronic device can include at least one user interface control disposed on the top wall and at least one electrical connection port, such as can be disposed on the side wall. The base unit includes a housing that has a top surface, a bottom surface, and at least one side wall. At least a portion of one of the surfaces is sound permeable and at least one speaker supported by the housing and oriented to direct sound through the sound permeable surface of the housing. The base unit includes a well, defined by an opening in the top surface of the housing. The well has a floor and a perimeter and is sized and shaped to receive the electronic device such that the bottom wall and at least a portion of the sidewall of the electronic device is disposed within the well in a first condition in which the electronic device is seated in the well. The opening is sized and shaped be to close fitting with respect to the electronic device. The base unit includes a chamber defined within the housing and at least one electronic connection port disposed within the chamber. An access window in the well provides a passage between the chamber and the well. The access window is sized and shaped such that an electrical connector wire can extend from at least one of the electronic connection ports disposed within the chamber, through the access window, to at least one of the electrical connection ports of the electronic device in the first condition in which the electronic device is seated within the well.

According to a further aspect of the invention, the electronic device is substantially cylindrically shaped and the well is substantially cylindrically shaped.

According to another aspect of the invention, the electronic device has a first depth and the well has a second depth, wherein the first and second depths are such that, in the first condition in which the electronic device is seated within the well, the electronic device extends at least partially above the top surface of the housing.

According to a further aspect of the invention, electronic device has a first depth and the well has a second depth, wherein the first and second depths are such that, in the first condition in which the electronic device is seated within the well, the top surface of the electronic device is substantially flush with the top surface of the housing.

According to another aspect of the invention, the base unit includes a power supply, wherein at least one of the base unit electrical connection ports provides electrical power from the power supply.

According to a further aspect of the invention, at least one of the base unit electrical connection ports is configured to receive audio data signals.

According to yet another aspect of the invention, at least one of the base unit electrical connection ports is configured to receive command data signals.

According to a further aspect of the invention, the base unit includes a display screen.

According to a still further aspect of the invention, the display screen is configured to be controlled by the electronic device in the first condition in which the electronic device is seated in the well and an electrical connection port of the electrical device is electrically connected to an electronic connection port of the base unit via a wire extending through the access window.

According to another aspect of the invention, the at least one speaker is configured to be controlled by the electronic device in the first condition in which the electronic device is seated in the well and an electrical connection port of the electrical device is electrically connected to an electronic connection port of the base unit via a wire extending through the access window.

According to a further aspect of the invention, the well is substantially centrally located in relation to the top surface of the base unit and the at least one speaker on either side of the well.

According to another aspect of the invention, the well is located at an offset position in relation to the top surface of the base unit and the at least one speaker is adjacent the well.

According to yet another aspect of the invention, in the first condition, the electronic device has at least one connection between the at least one electrical connection port and the at least one electronic connection port and wherein the at least one connection impedes removal of the electronic device from the well. The electronic device has a second condition in which it is disposed within the well free of connections between the at least one electrical connection port and the at least one electronic connection port, whereby the electronic device is removable from the well.

According to yet another aspect of the invention, the access window is defined by the perimeter of the well. This arrangement ensures cooperation with an electronic device of the type that has the at least one electrical connection port disposed on its sidewall.

These and other aspects, features and advantages will be apparent upon consideration of the following description of certain embodiments of the invention in view of the accompanying drawing figures.

DETAILED DESCRIPTION CERTAIN OF EMBODIMENTS OF THE INVENTION

Referring to FIGS. 1-8 an electronic base unit 100 is provided. The base unit 100 can have a relatively low-profile rectangular-shaped housing. However, other shapes such as cubes, cylinders, or other three-dimensional shapes can be employed consistent with the disclosure herein. The base unit 100 includes a top wall 102, a bottom wall 104, and side walls 106 extending between the top wall 102 and the bottom wall 104. The base unit 100 can be a clock-type device, such as a bedside or counter-top type unit, which can include a time display and speakers, as discussed in more detail below. The base unit 100 can be an alarm clock, bedside clock, AM/FM radio, CD player, digital audio file player (e.g., MP3 player) or other similar device, for example.

Figure 10:
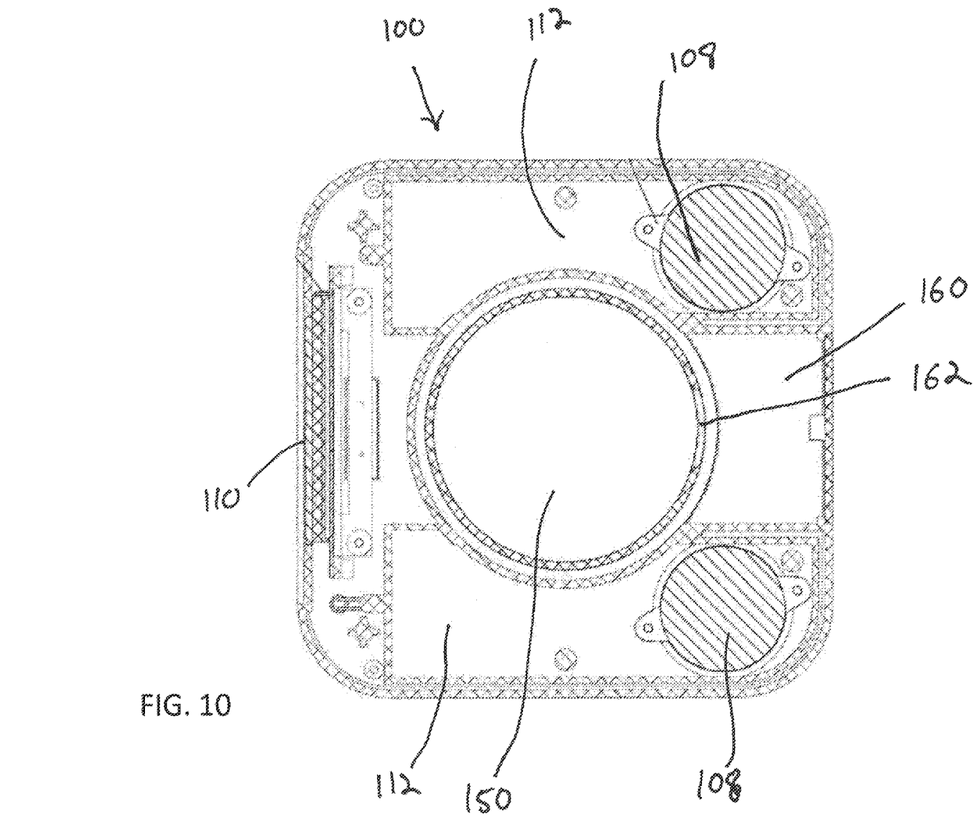
FIG. 10 is a cross section view along line B-B of FIG. 4.

The base unit 100 can include various electronic components, including, for example, speakers 108 and a display 110. As can be seen in the cross-section of FIG. 10, the speakers 108 can be disposed within an interior of the base unit 100 and the sound producing portion of the speakers 108 can be directed upwardly toward the top surface 102. The top surface 102 can be constructed to be sound permeable so that sound from the speakers 108 can pass through the top surface 102 without significantly negatively impacting the sound quality and the sound can be heard in the surrounding environment. For example, the top surface 102 can have multiple holes that allow sound to pass through (e.g., similar to a speaker grill) or the top surface 102 can be constructed of a supporting lattice and a sound transmissive fabric covering over the lattice. The base unit 100 can also include resonant chambers 112 disposed adjacent the speakers that amplify and enhance certain sound frequencies (e.g., bass notes) that can improve the overall quality of the sound, as shown in FIG. 10. The speakers 108 can be used to produce various sounds, including music, voice sounds (e.g., phone calls and artificial personal assistants) and/or alert tones (e.g., alarms, indication tone, etc.)

In alternative embodiments, a surface other than the top surface can be made to be sound permeable and the speakers 108, an internal sound channel, or both can be arranged so that sound is directed to the sound permeable surface.

The base unit 100 can include a display 110 that can be a LCD, LED, or other electronic display screen. The display 110 can be used to display various information, including, for example, a clock time, alarm times, music title and related information, etc. The display 110 can also function as a user interface and provide various information concerning the operation of the device (e.g., whether music is playing, song information, battery levels, signal strength, etc.). The base unit 100 can include a processor, memory, and software executing on the processor to control the operation of the display 110. The base unit 100 can include a power source, such as batteries 114 (see FIG. 9) and/or a plug for connection to an external AC power source. The base unit 100 can also include a power conditioner unit for converting power (e.g., from an external AC power source) to a suitable DC power supply (for example, DC power compatible for USB power standard of 5V DC) that can be used for powering electronic accessory devices, as discussed in more detail below.

Figures 11A, 11B, 12:
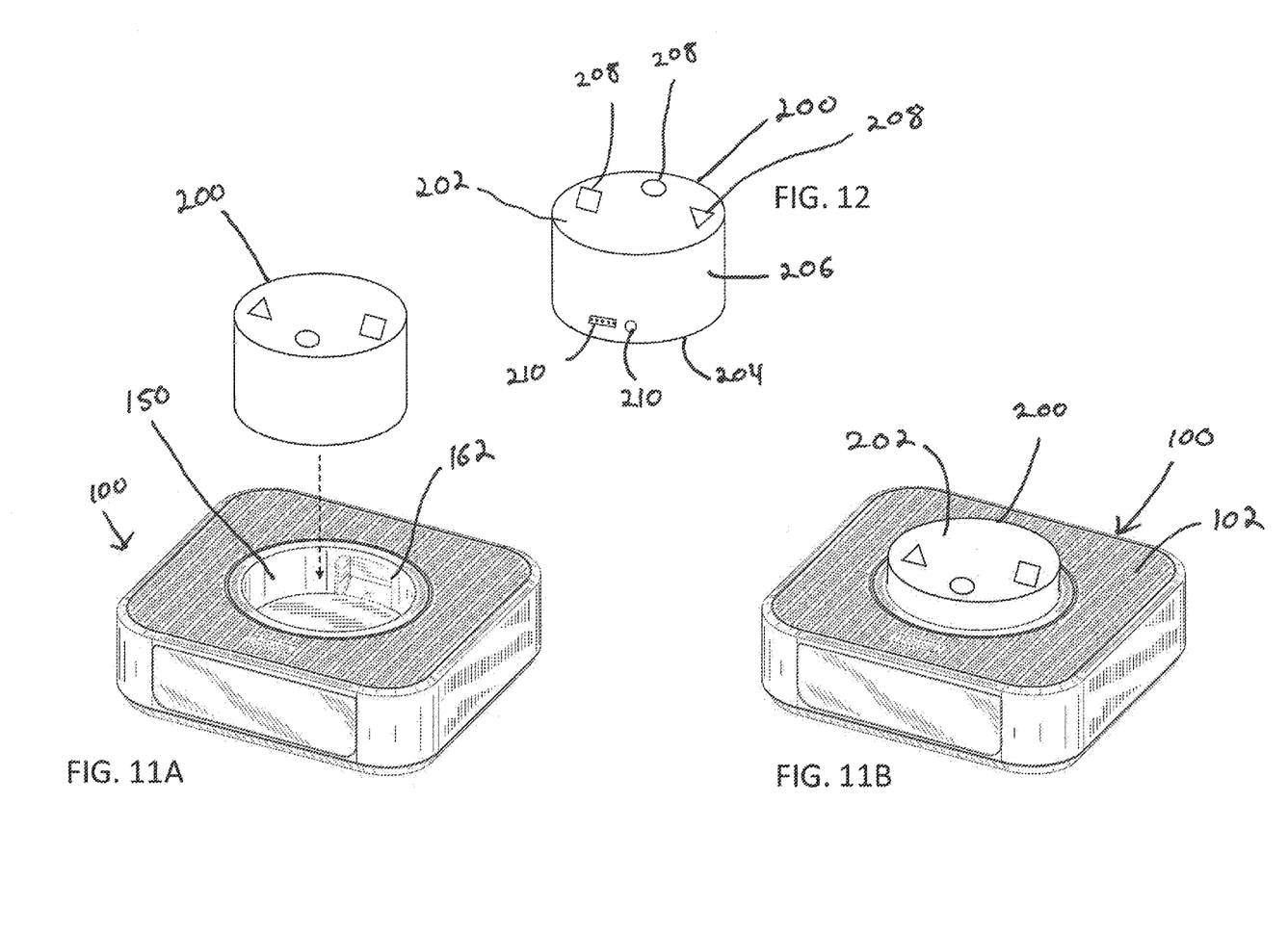
FIG. 11A is a front perspective view of the base unit in relation an electronic device according to an embodiment of the present invention.
FIG. 11B is a front perspective view showing the electronic device seated with respect to the base unit.
FIG. 12 is a rear perspective view of the electronic device.

The base unit 100 includes a well 150. The well 150 can be a recess in the central portion of the base unit 100 that is sized and shaped to receive an electronic device 200 of given dimensions, which is described in more detail below. As can be seen in FIGS. 11A-B, the electronic device 200 suitable for use in the illustrated embodiment has a generally cylindrical shape and, as such, the well 150 is sized and shaped to provide a generally cylindrical recess that compliments the shape of the electronic device 200. The well 150 is sized and shaped to be close fitting with respect to the electronic device 200 when the electronic device is received within the well 150. For example, the close fitting seated relationship between the electronic device 200 and the well 150 can be such that gap is minimized, e.g., a gap of 2 mm, 5 mm, 10 mm, etc., as dimensional tolerance will permit while allowing the electronic device 200 to be inserted and removed from the well 150. For example, FIG. 11B illustrates the electronic device 200 disposed within the well 150 in a close-fitting relationship with the perimeter of the well 150 that reduces gaps between the electronic device 200 and the well 150. The well 150 has a perimeter wall 152, a floor 154, and an opening 156 defined through the top surface 104 of the base unit 100. In other embodiments, the well can have a square, rectangular, elliptical, or another shape to complement and closely fit and seat electronic devices having corresponding exterior shapes, at least at their lower portion which is to be received in the well.

The base unit 100 includes a chamber 160. The chamber 160 includes electronic connection ports 158. The electronic connection ports 158 can be a combination of separate ports or a single, multifunction port. The ports can include, for example, a USB port, mini USB port, micro USB port, power jack port, audio jack port, APPLE Lighting Connector port, or any other combination of standard and/or proprietary electrical connection ports. A multifunction port, such as a USB-C port, provides certain advantages because USB ports can be used to provide power and/or transfer data, such as audio data.

Figure 1:
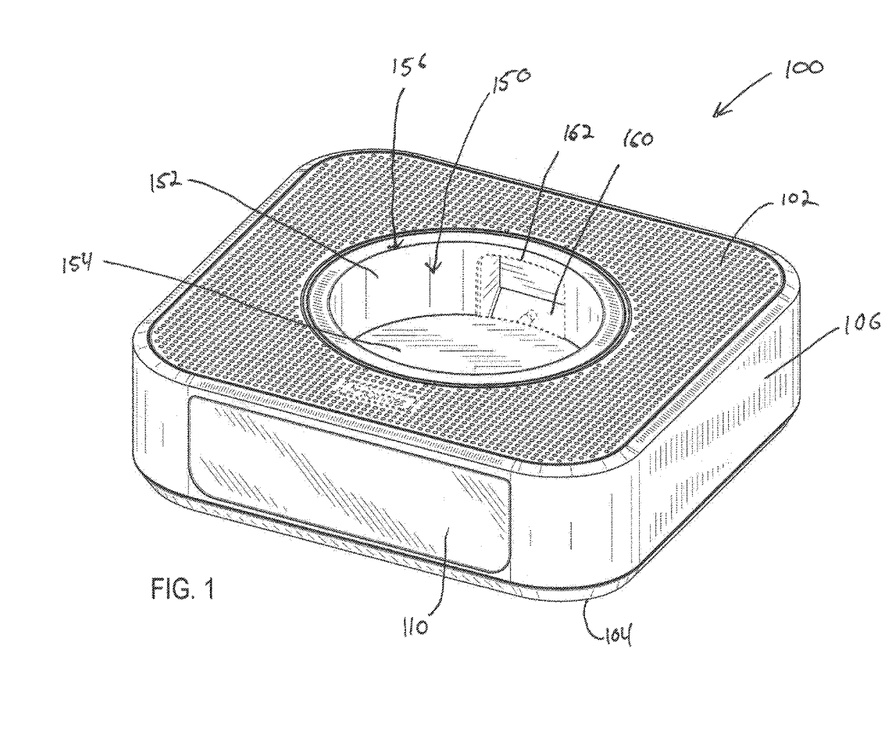
FIG. 1 is a front perspective view of a base unit according to an embodiment of the present invention.
Figure 2:
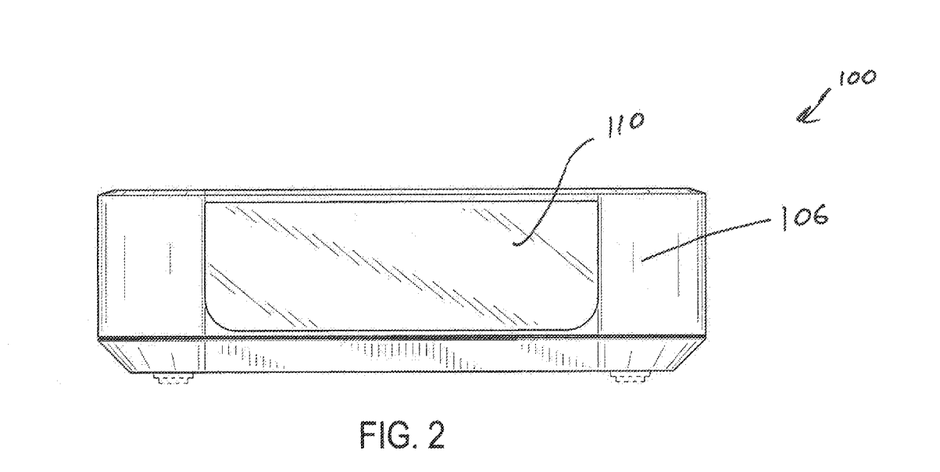
FIG. 2 is a front view thereof.
Figure 3:
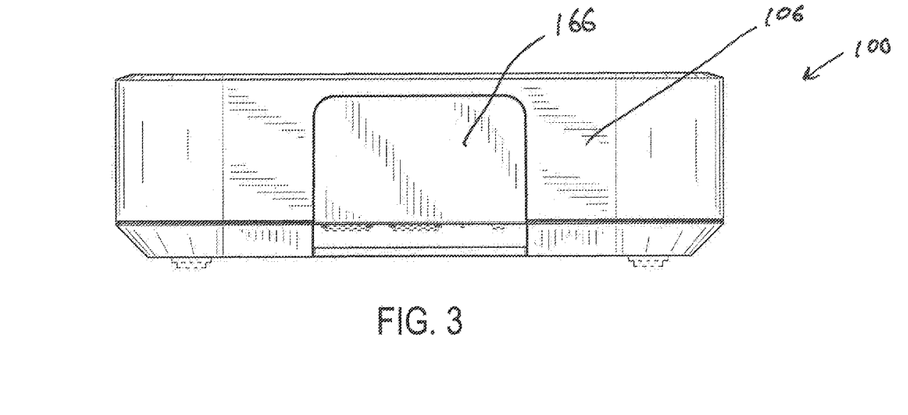
FIG. 3 is a rear view thereof.
Figure 4:
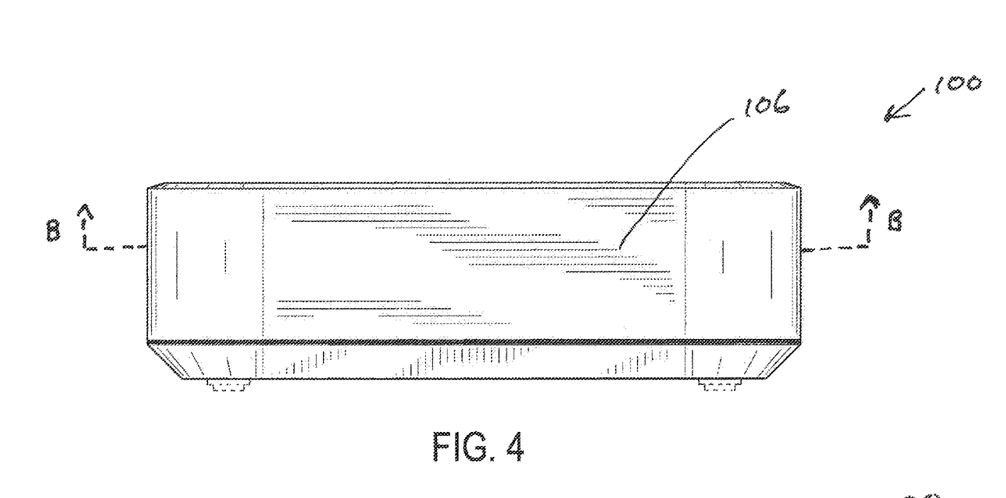
FIG. 4 is a left side view thereof.
Figure 5:
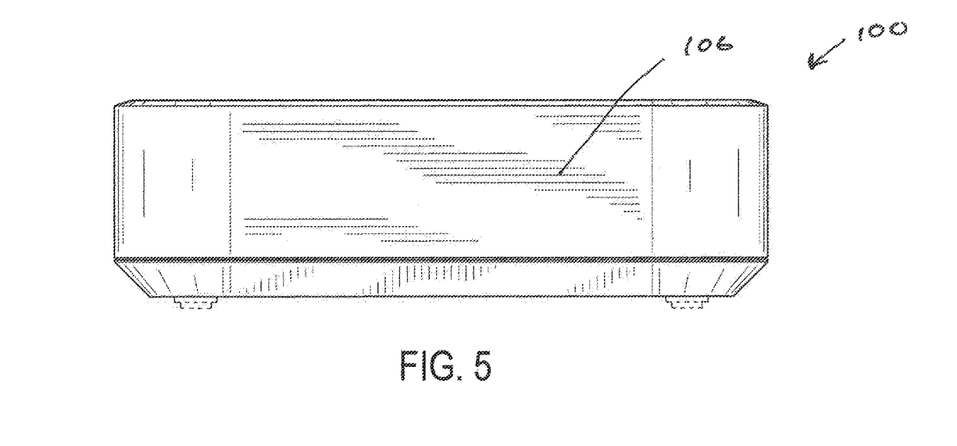
FIG. 5 is a right side view thereof.
Figure 6:
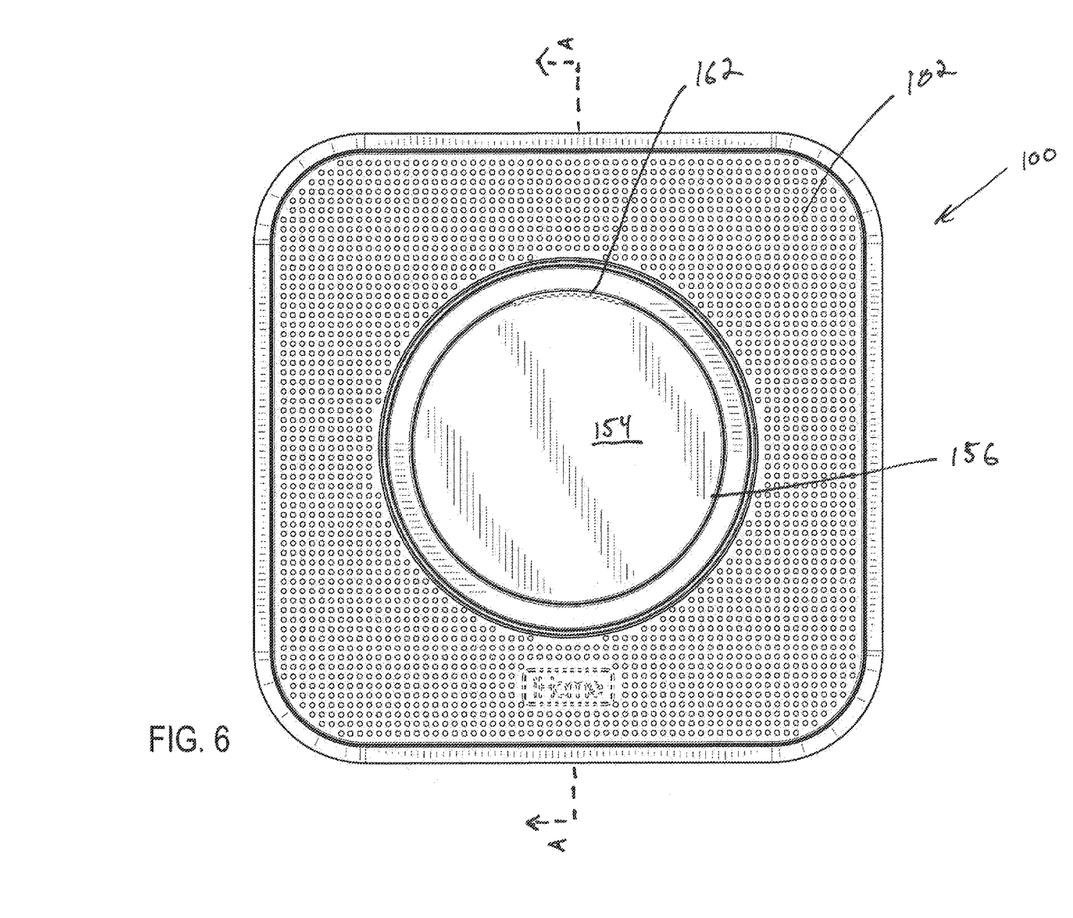
FIG. 6 is a top view thereof.
Figure 7:
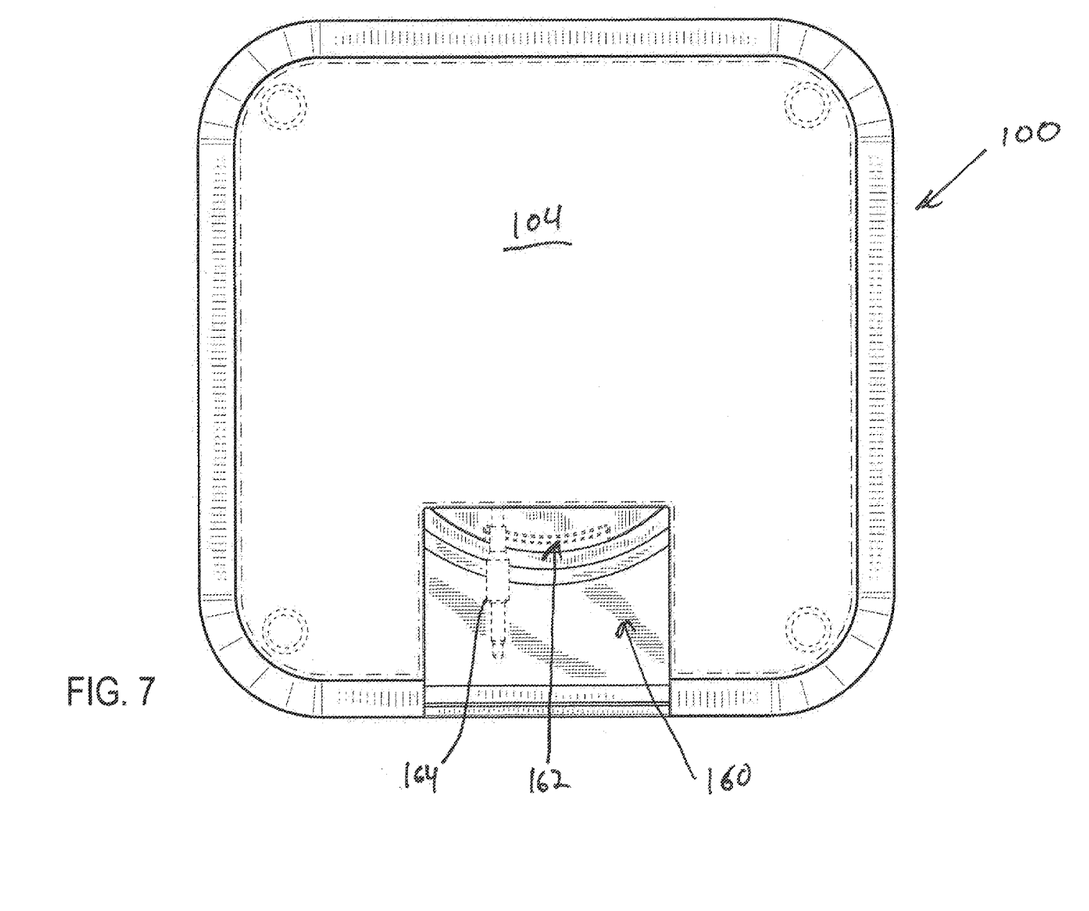
FIG. 7 is a bottom view thereof.
Figure 8:
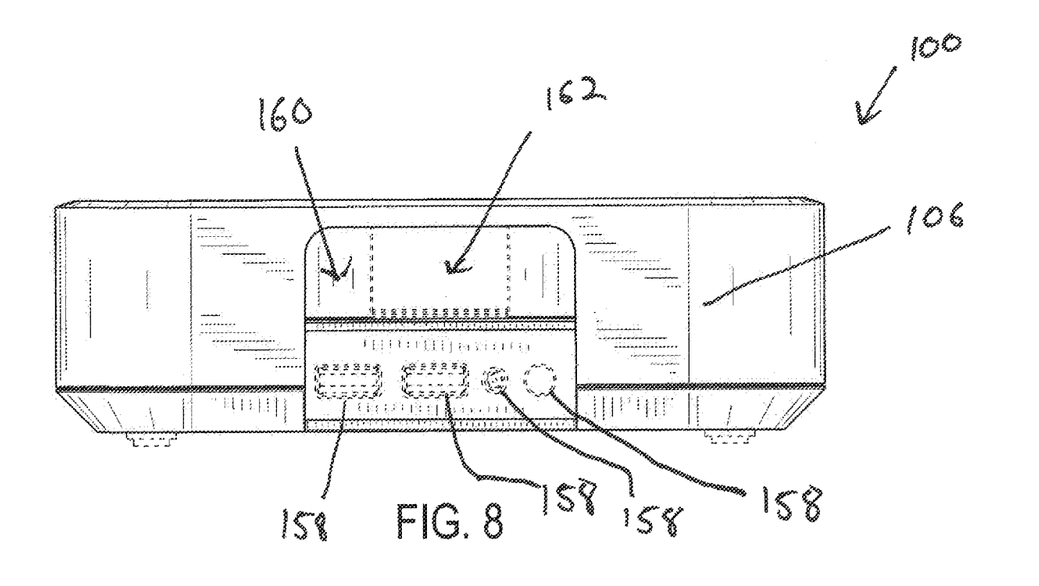
FIG. 8 is a rear view thereof with an access cover removed.

An access window 162 provides a passage between the well 150 and the chamber 160. The access window 162 is sized and shaped to permit at least one an electrical connector wire 164 to pass through the access window 162. Accordingly, the electronic device 200, discussed in more detail below, can be seated within the well 150 and can be electrically connected to the base unit via the electrical connector wire 164 and the electrical ports 158. The electrical connector wire comprises, generally, insulated conductive wires. For instance, the connector wire 164 can be a USB-type cable, power cable, audio cable, or any other suitable cable capable of conducting power and/or data signals (e.g., audio signal, command signals, etc.). As can be seen in FIGS. 3 and 8, the chamber 160 can be accessible from a rear side of the base unit 100 and an option cover 166 can be provide to conceal the chamber and the electrical ports 158 when access is not required.

Figure 9:
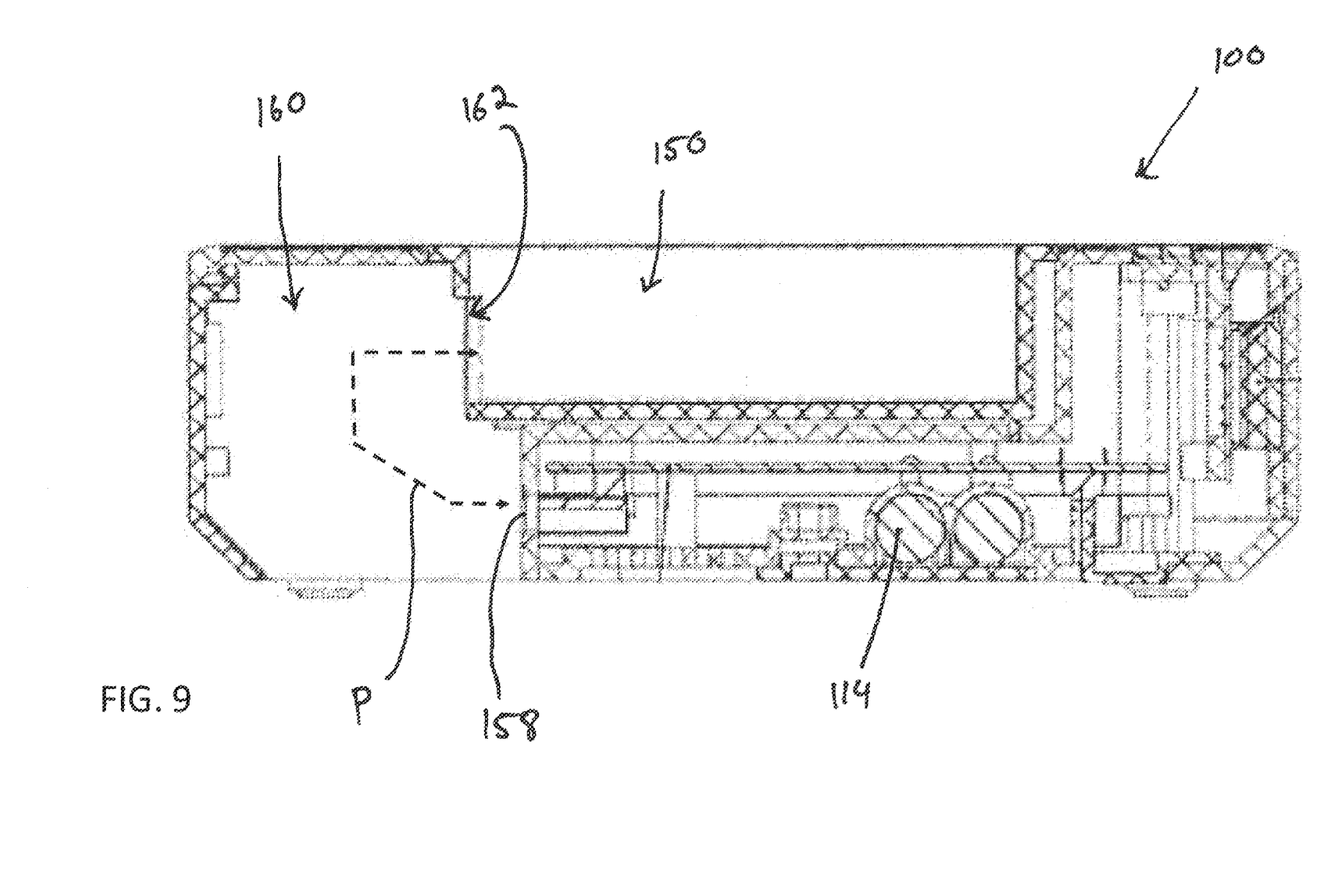
FIG. 9 is a cross section view along line A-A of FIG. 6.

As can be seen in FIG. 9, the path P from the well 150, through access window 162, into the chamber 160, and to the electronic connection ports 158 routes entirely within the confines of the base unit 100. As such, the electrical connector wire 164 is not outwardly visible from the top wall 102 of the base unit 100 when the electronic device 200 is seated in the well 150 and connected to the base unit 100 via the electrical connector wire 164.

Referring to FIGS. 11A-B and 12, in the illustrated embodiment, the electronic device 200 is generally cylindrical in shape and includes a housing that has a top wall 202, bottom wall 204, and a side wall 206. The electronic device 200 can include various user controls 208 (e.g., buttons, touch sensitive surfaces, etc. and/or including remote controls that can eliminate the need for touch-type controls). As can be seen in FIG. 12, the electronic device 200 can include electrical connection ports 210 located on the side wall 206 of the electronic device 200, for example, on a rear side of the electronic device. Alternatively, the electronic device 200 can have electrical connection ports located elsewhere, or can employ wireless technologies (e.g., Bluetooth, inductive charging) for one or more of its connections to external devices. Referring to FIG. 11B, the electronic device 200 seats within the well 150 with a close fit between the perimeter wall 152 and the exterior of the electronic device, and is orientable so that electrical connection ports 210 on the side wall 206 of the electronic device are in register with the opening 162 in the perimeter wall 152. With this orientation, and electrical connections can be established between the electronic device 200 and the electronic connection ports 158 of the base unit through the access door 166 to the chamber 160. Once electrically connected, the electronic device 200 is in a first condition in which it is seated within the well and is not readily removable. In particular, the electrical connections (e.g., power, audio signals, data) restrain or preclude removal of the electronic device 200 from the base unit due to the close fit nature of the seating of the electronic device within the well. As can be seen in FIG. 11B, the top surface 202 of the electronic device 200 protrudes above the top 102 of the base unit 100 when the electronic device 200 is seated in well 150, which is caused by a difference in the depth of the electronic device 200 verses the depth of the well 150. The depth of the well 150 can be selected to adjust the amount of the protrusion to various degrees, and can be selected so that the top surface 202 of the electronic device 200 is flush, nearly flush, or recessed with respect to the top surface 102 of the base unit 100, for example. Preferably, any controls on a side surface of the electronic device 200 remain accessible to a user (i.e., remain exposed) when the electronic device 200 is seated in the well 150 of the base unit 100. Preferably, and in accordance with the illustrated embodiments, any ports for electronic connection that are located on a side surface of the electronic device 200 are concealed below the top surface 102 when the electronic device 200 is seated in the well 150 of the base unit 100.

As one example of use, an electronic device 200 is inserted into the well 150 of the base unit 100. Cover 166 is removed to provide access to the chamber 160 from the rear of the base unit 100. The electronic device 200 is rotated or otherwise seated so that its electrical connection port(s) 210 is (are) aligned with the access window 162. With the electronic device port 210 aligned with the access window 162, one end of the electrical connector wire 164 can be inserted into the connection port 210. The wire 164 extends to the connection port 210 via the access window 162 from the chamber 160. The chamber 160 has capacity to store additional length of wire 164. The opposite end of the wire 164 can be inserted one of the electrical ports 158 of the base unit 100. Accordingly, the electronic device 200 can be electrically connected to the base unit 100 with the wire 164 concealed from a top surface 102 of the base unit. Further, power can be provided from the base unit 100 to the electronic device 200 via wire 164 and/or data signals (e.g., audio data) can be provided from the electronic device 200 to the base unit 100, which, in the case of audio data, can be audibly amplified via speakers 108. As can be seen in FIGS. 11 and 12, the electronic device 200 is inserted into the well 150 in a vertical direction while the electrical wire 164 is connected to the electronic device in a horizontal direction. Since the electrical wire 164 extends past the perimeter 152 of the well 150 and into through the access window 162 in a horizontal direction, the connection of the electrical wire 164 can impede or prevent the removal of the electronic device 200 from the well 150 when in this first condition, seated within the well 150 and connected via wire 164. Accordingly, to remove the electronic device 200 from the well, the electrical wire 164 must be first removed by accessing the chamber 160 from the rear access panel of the base unit, and in this second condition, in which the electronic device 200 is in the well free of any electrical connections to the ports 158, the electronic device 200 can be removed from the well. In the illustrated embodiment, removal is by lifting upward, with movement in a single direction. In other embodiments, movement can be in a different, single direction when the electronic device is seated in this second condition. In this arrangement, the electronic wire 164 can concurrently enable communication between the electronic device 200 and the base unit 100 and impede or prevent inadvertent removal of the electronic device 200 from the base unit 100. Meanwhile, the cover 166 conceals the connections between the electronic device 200 and the base unit 100.

The invention has been described with regard to certain embodiments thereof to aid in an understanding thereof, but the invention itself is more broadly defined by the recitations in any claims appended hereto, and equivalents of such recitations, and the claims are to be read with that in mind.

The invention claimed is:
1. A base unit that is adapted to physically and electronically engage with an electronic device, the electronic device having a housing with a top wall, a bottom wall, and a side wall extending therebetween, the electronic device having at least one user interface control disposed on the top wall and at least one electrical connection port, the base unit comprising:
- a housing having a top surface, a bottom surface, and at least one side wall, at least a portion of one of said surfaces being sound permeable;
- at least one speaker supported by the housing and oriented to direct sound through the sound permeable surface of the housing;
- a well, defined by an opening in the top surface of the housing, the well having a floor and a perimeter, the well being sized and shaped to receive the electronic device such that the bottom wall and at least a portion of the sidewall of the electronic device is disposed within the well in a first condition in which the electronic device is seated in the well, the opening being sized and shaped be to close fitting with respect to the electronic device;
- a chamber defined within the housing;
- at least one electronic connection port disposed within the chamber; and
- an access window defined by the well that provides a passage between the chamber and the well, wherein the access window is sized and shaped such that an electrical connector wire can extend from at least one of the electronic connection ports disposed within the chamber, through the access window, to at least one of the electrical connection ports of the electronic device in the first condition in which the electronic device is seated within the well.

2. The base unit of claim 1, wherein the electronic device is substantially cylindrically shaped and the well is substantially cylindrically shaped.

3. The base unit of claim 1, wherein the electronic device has a first depth and the well has a second depth, wherein the first and second depths are such that, in the first condition in which the electronic device is seated within the well, the electronic device extends at least partially above the top surface of the housing.

4. The base unit of claim 1, wherein the electronic device has a first depth and the well has a second depth, wherein the first and second depths are such that, in the first condition in which the electronic device is seated within the well, the top surface of the electronic device is substantially flush with the top surface of the housing.

5. The base unit of claim 1, further comprising a power supply, wherein at least one of the base unit electrical connection ports provides electrical power from the power supply.

6. The base unit of claim 1, wherein at least one of the base unit electrical connection ports is configured to receive audio data signals.

7. The base unit of claim 1, wherein at least one of the base unit electrical connection ports is configured to receive command data signals.

8. The base unit of claim 1, further including a display screen.

9. The base unit of claim 8, wherein the display screen is configured to be controlled by the electronic device in the first condition in which the electronic device is seated in the well and an electrical connection port of the electrical device is electrically connected to an electronic connection port of the base unit via a wire extending through the access window.

10. The base unit of claim 1, wherein the at least one speaker is configured to be controlled by the electronic device in the first condition in which the electronic device is seated in the well and an electrical connection port of the electrical device is electrically connected to an electronic connection port of the base unit via a wire extending through the access window.

11. The base unit of claim 1, wherein the well is substantially centrally located in relation to the top surface of the base unit and the at least one speaker on either side of the well.

12. The base unit of claim 1, wherein the well is located at an offset position in relation to the top surface of the base unit and the at least one speaker is adjacent the well.

13. The base unit of claim 1, wherein, in the first condition, the electronic device has at least one connection between the at least one electrical connection port and the at least one electronic connection port and wherein the at least one connection impedes removal of the electronic device from the well, and wherein the electronic device has a second condition in which it is disposed within the well free of connections between the at least one electrical connection port and the at least one electronic connection port, whereby the electronic device is removable from the well.

14. The base unit of claim 1, wherein the access window is defined by the perimeter of the well and wherein the electronic device has the at least one electrical connection port disposed on the sidewall of the electronic device.

* * * * *